INVENTORS
MUNEHARU MOROZUMI
KORO YAGZIMA
BY
M<sup>c</sup>Glew and Toren
ATTORNEYS 3,572,151
PROFILE SHIFTED INVOLUTE INTERNAL GEAR APPARATUS HAVING NO DIFFERENCE IN NUMBER OF TEETH BETWEEN INTERNAL GEAR AND PINION
Muneharu Morozumi, 293–1 Aza Kitanaka, Oaza Kurita, and Koro Yaezima, 1699–2 Wakazato Minamiichi, both of Nagano-shi, Nagano-ken, Japan
Filed Oct. 8, 1969, Ser. No. 864,827
Claims priority, application Japan, Oct. 12, 1968, 43/74,447
Int. Cl. F16h 1/06, 55/06
U.S. Cl. 74—413                                                1 Claim

ABSTRACT OF THE DISCLOSURE

An internal gearing comprises an internal gear and a pinion having no difference in number of teeth and arranged in intermeshing engagement with an appropriate center distance and with a contact ratio of greater than 1, by providing adequate profile shifting to the internal gear and the pinion of ordinary involute tooth profile.

---

Figure 2:
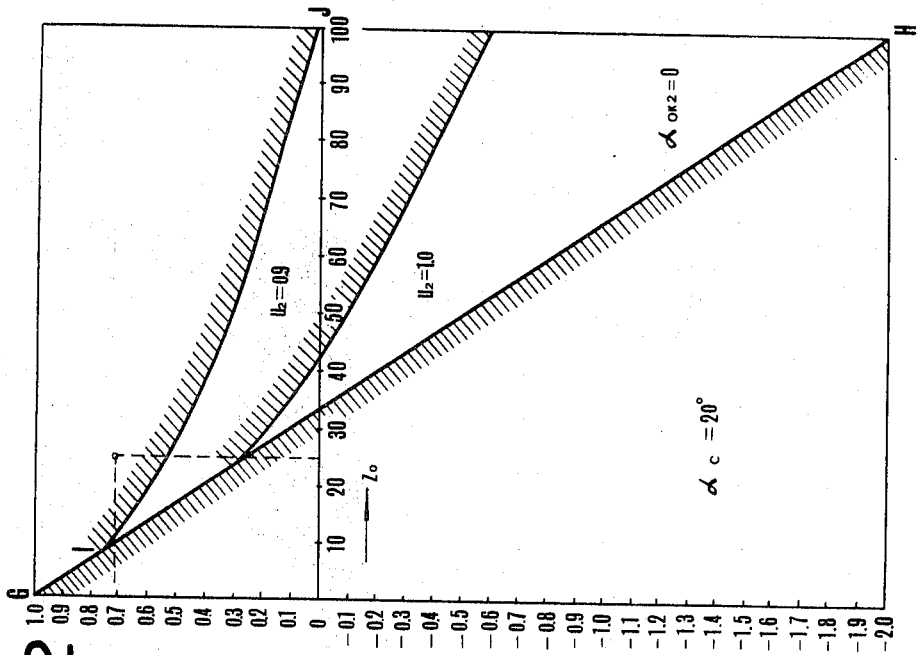

The present invention relates to profile shifted involute internal gear apparatus consisting of an internal gear and a pinion having gear teeth which, wherein gears are cut in either one of the internal gear or pinion or in both of them in a profile shifted manner such that the difference in number of teeth between internal gear and pinion is zero and the contact ratio is more than 1.

Planet gears in a hypo-cycloid reduction gear apparatus all revolve and rotate at the same time, and the absolute rotation number, which is synthesized by said revolution and rotation directly with a ratio of 1:1, to the driving shaft positioned on the axis of revolution is achieved in one method by a pin and adjusting holes, in a method by Oldham coupling and a method by universal coupling, etc. However, these methods frequently involve difficulties in operation and it is difficult to obtain compact design.

Therefore, in lieu of the above, if such profile the internal gearing is formed so as to have no difference in number of teeth and arranged with a center distance which is equal to the radius of revolution of the above mentioned planet gear, the absolute rotation number which is synthesized with revolution and rotation of the planet gear can be taken out directly with a ratio of 1:1 to the driving shaft positioned on the axis of revolution, thus compact and durable reduction gearing having high reduction ratio can be obtained.

The present inventor has succeeded to obtain an internal gearing having no difference in number of teeth and intermeshing with an appropriate center distance and with a contact ratio of greater than 1, by providing adequate profile shifting of the internal gear and the pinion of ordinary involute tooth profile.

In order to establish such internal gearing the conditions shown below must be satisfied. In the following conditions the notations shown below will be used:

$m_o$: module
$\alpha_c$: cutter pressure angle
$Z_o$: number of teeth of pinion and internal gear
$x_{o1}, x_{o2}$: Vertical addendum modification coefficient of pinion and of internal gear, respectively
$u_1, u_2$: Lateral addendum modification coefficient of pinion and of internal gear, respectively
$h_{ok}$: addendum coefficient (for full depth tooth: $h_{ok}=1$, for stub tooth: $h_{ok}<1$, for larger depth tooth: $h_{ok}>1$)
$\alpha_{ok1}, \alpha_{ok2}$: Addendum pressure angle of pinion and internal gear, respectively
$S_n$: normal backlash
$a_o$: center distance
$\epsilon_o$: contact ratio (1) The addendum circle of the internal gear must be larger than the base circle.

CONDITION EQUATION $$Z_o \geq \frac{(2h_{ok}-x_{o2})}{1-\cos \alpha_c}$$

or $$\alpha_{ok22} \geq 0$$

(2) The addendum or tip of the internal gear tooth must not be sharply pointed.

CONDITION EQUATION $$\frac{\pi}{2} - 2x_{o2} \tan \alpha_c - u_2 - Z_o(\text{inv } \alpha_c - \text{inv } \alpha_{ok2}) \geq 0$$

provided that $$\text{inv } \alpha_{ok2} = \tan \alpha_{ok2} - \alpha_{ok2}$$

$$\cos \alpha_{ok2} = \frac{Z_o \cos \alpha_c}{Z_o - 2h_{ok} + 2x_{o2}}$$

(3) The addendum or tip of the pinion tooth must not be sharply pointed.

CONDITION EQUATION $$\frac{\pi}{2} + 2x_{o1} \tan \alpha_c - u_1 - Z_o(\text{inv } \alpha_{ok1} - \text{inv } \alpha_c) \geq 0$$

provided that $$\text{inv } \alpha_{ok1} = \tan \alpha_{ok1} - \alpha_{ok1}$$

$$\cos \alpha_{ok1} = \frac{Z_o \cos \alpha_c}{Z_o + 2h_{ok} + 2x_{o1}}$$

(4) Pinion must not have undercut

CONDITION EQUATION $$x_{o1} \geq h_{ok} - \tfrac{1}{2} Z_o \sin^2 \alpha_c$$

(5) Contact ratio must be larger than 1.

CONDITION EQUATION $$\frac{1}{\pi} \left\{ \frac{Z_o}{2}(\tan \alpha_{ok1} - \tan \alpha_{ok2}) + \tan \alpha_c(x_{o2} - x_{o1}) \right.$$

$$\left. + \tfrac{1}{2}(u_1 + u_2) - \frac{\frac{S_n}{m_o}}{2 \cos \alpha_c} \right\} \geq 1$$

(6) Avoid involute interference

CONDITION EQUATION $$(x_{o2} - x_{o1}) \leq \frac{Z_o}{2} \cot \alpha_c \tan \alpha_{ok2} - \tfrac{1}{2} \cot \alpha_c (u_1 + u_2)$$

$$+ \frac{\frac{S_n}{m_o}}{2 \sin \alpha_c}$$

(7) The center distance $a_o$ must satisfy the following equation:

$$a_o = m_o \left\{ \sin \alpha_c (x_{o2} - x_{o1}) + \tfrac{1}{2} \cos \alpha_c (u_1 + u_2) \right\} - \frac{S_n}{2}$$

In the intermeshing of above mentioned internal gearing it has been proven that there will be no trochoidal interference. Also when the pinion is placed into an intermeshing position by moving the pinion axially into the internal gear, no special requirements are necessary for trimming. On the other hand, there must not be an interference between the fillet at the dedendum of internal gear and the addendum of pinion, and there must not be an interference between the fillet at the dedendum of pinion and addendum of internal gear.

At the same time, there must be radial clearance between the bottom land of internal gear and the tip or tooth crest of pinion, and clearance between the bottom land of pinion and the tooth crest of internal gear. Now, in the internal gearing described above, as the addendum of pinion cutter and hob for cutting internal gear and pinion is made with extra height of $0.25m_o$ which is equivalent to the radial clearance, the problems just mentioned above do not necessarily have to be considered.

Now (interference) line diagrams are made for obtaining such $Z_o$, $x_{o1}$, $x_{o2}$, $u_1$, $u_2$, $a_o$, $S_n$ as satisfying all of the above mentioned conditions (1) through (7), provided that:

$\alpha_c=20°$, $h_{ok}=1.0$, $u_1+u_2=0$ to 1.0 (calculated at every 0.1 value)

$x_{o1}=2.0$ to 0.5 (calculated at every 0.1 value)
$x_{o2}=-2.0$ to 1.0 (calculated at every 0.1 value)

Figure 1:
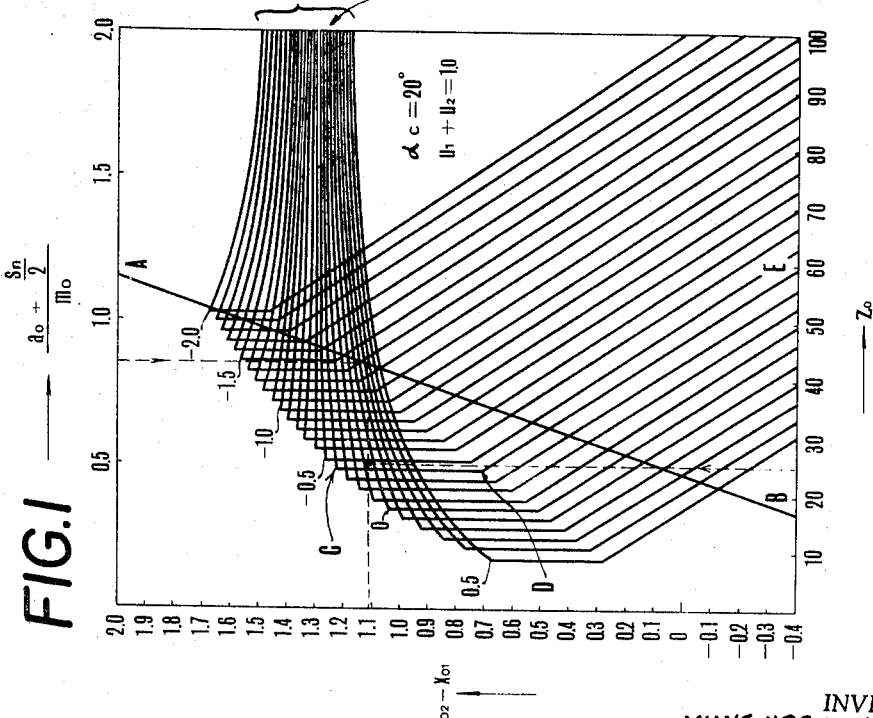
Figure 3:
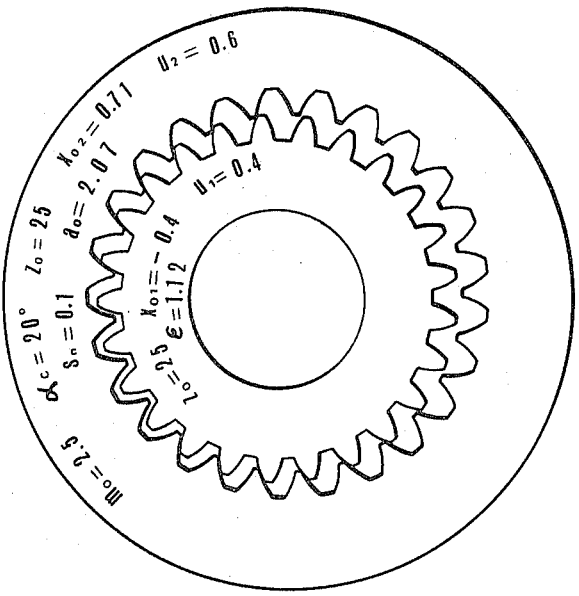
Figure 4:
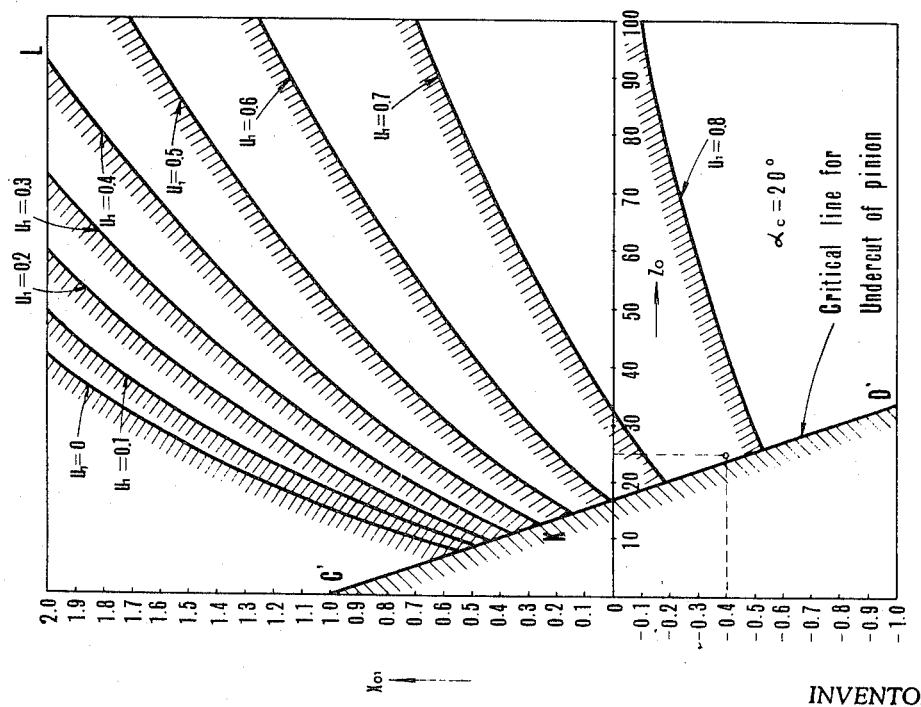

The present invention shall be described in detail referring to the attached drawings in which:

FIG. 1 through FIG. 3 are interference line diagrams of profile shifted involute internal gearing having no difference in number of teeth. FIG. 4 shows profile shifted involute internal gearing having no difference in number of teeth according to the present invention.

In FIG. 1 a diagram for $\alpha_c=20°$, $u_1+u_2=1.0$ is shown, wherein latitude shows $Z_o$ $$\left(\text{the upper latitude shows } \frac{a_o+\frac{S_n}{2}}{m_o}\right)$$

and longitude shows $(x_{o2}-x_{o1})$.

In the drawing, for $x_{o1}=-0.4$:

Straight line AB—Straight line giving the relationship between $$\frac{a_o+\frac{S_n}{2}}{m_o}$$

and $(x_{o2}-x_{o1})$ (condition (7))

Straight line CD—Critical line for undercut of pinion (condition (4))
Curve CF—Critical line for contact ratio $a_o=1$ (condition (5))
Curve DE—Critical line for involute interference (condition (6))

In FIG. 1, the area surrounded by straight line CD, curve CF, and curve DE is the safety zone which satisfies conditions (4), (5) and (6).

FIG. 2 shows critical line diagram for sharp-pointedness in tip or crest of internal gear with $\alpha_c=20°$, wherein latitude shows $Z_o$ and longitude shows $x_{o2}$.

Straight line GH—Critical line for $\alpha_{k2}=0$ (condition (1))
Curve IJ—Critical line for sharp-pointedness in tip or tooth crest of internal gear, corresponding to $u_2=0.9$ (condition (2))

The side with hatching is the area where conditions are not satisfied, while the area to the right of the straight line GH and below the curve IJ is the safety zone which satisfies the conditions (1) and (2).

The critical line for sharp-pointedness in tip or tooth crest, corresponding to $u_2=0$ to 0.8, does not appear in the drawing.

Therefore, when $Z_o=25$
$x_{o2}=0.71$
$u_2=0.6$ the tip or tooth crest will not be sharply pointed.

FIG. 3 shows critical line diagram for sharp-pointedness in the tip or crest of pinion with $\alpha_c=20°$, wherein latitude shows $Z_o$ and longitude shows $x_{o1}$. Now, for $u_1=0.4$:

Curve KL—Critical line for sharp-pointedness in tip or crest of pinion (condition (3))
Straight line C'D'—Critical line for undercut of pinion (condition (4), this is equivalent to straight line CD in FIG. 1)

The side with hatching is the area where the conditions are not satisfied, while the area below the curve KL and to the right of the straight line C'D' is the safety zone which satisfies conditions (3) and (4).

By using these FIG. 1, FIG. 2 and FIG. 3, the number of teeth and addendum modification coefficient of such internal gear and pinion as satisfying all conditions (1) through (7) can be easily determined.

For applying these diagrams for stub tooth and larger depth tooth instead of full depth tooth, $Z_o/h_{ok}$ $x_{o1}/h_{ok}$ $x_{o2}/h_{ok}$ $u_1/h_{ok}$
$u_2/h_{ok}$ $a_o/h_{ok}$ $S_n/h_{ok}$ may be used in place of $Z_o$, $x_{o1}$, $x_{o2}$, $u_1$, $u_2$, $a_o$, $S_n$.

Next, examples of the present invention shall be shown below.

The addendum modification coefficient for $\alpha_c=20°$, $m_o=2.5$, $h_{ok}=1$, $a_o=2.07$, $S_n=0.1$ will be obtained. First it is supposed that $u_1+u_2=1.0$, then $$\frac{a_o+\frac{S_n}{2}}{m_o}=0.848$$

is taken on the appear latitude of FIG. 1, then from that point a straight line is drawn vertically downward, then at the intersection with the straight line AB a straight line is drawn in parallel with latitude. Then find out the intersection of said straight line with longitude, thus obtaining $(x_{o2}-x_{o1})=1.11$.

Next, as the point which is on said straight line and is within the safety zone surrounded by straight line CD, curve CF and curve DE, $x_{o1}=-0.4$, $Z_o=25$ was used, then $$x_{o2}=(x_{o2}-x_{o1})+x_{o1}=0.71$$

was obtained. These values satisfy conditions (4), (5), (6), and (7). Next, from $u_1+u_2=1.0$ it is tentatively supposed that $u_1=0.4$, $u_2=0.6$.

Then in FIG. 2 as the point $Z_o=25$, $x_{o2}=0.71$ corresponding to $u_2=0.6$ is within the safety zone, it is revealed that conditions (1) and (2) are satisfied.

At the same time, in FIG. 3 the point as $Z_o=25$, $x_{o1}=-0.4$ corresponding to $u_1=0.4$ is within the safety zone, it is revealed that conditions (3) and (4) are satisfied. FIG. 4 shows the drawing of the internal gearing which has no difference in number of teeth and is so designed.

In gear-cutting of such internal gear and pinion, after making the profile shifted gear cutting with the amount of vertical addendum modification, of $m_o x_{o2}$ and $m_o x_{o1}$, respectively, another gear cutting is given by rotating the pinion cutter as much as the amount of lateral addendum modification, $m_o u_2$ and $m_o u_1$, respectively. For gear-cutting of the pinion with rack cutter or hob, after making the profile shifted gear cutting with the amount of vertical addendum modification of $m_o x_{o1}$, another gear cutting may be given by shifting the rack cutter or hob to the direction of pitch line as much as the amount of lateral addendum modification of $m_o u_1$.

Now, in order to perform gear cutting of internal gear and pinion by one cutting, the pinion cutter for gear cutting of internal gear which has a thickness on the standard pitch circumference which is greater than the normal circular thickness by such amount as $m_o u_2$, may be used to finish cutting by one gear cutting with the amount of vertical addendum modification of $m_o x_{o2}$.

On the other hand, the pinion cutter for gear cutting of pinion, which has a thickness on the standard pitch circumference which is greater than normal circular thickness by such amount as $m_o u_1$, may be used to finish cutting by one gear cutting with the amount of vertical addendum modification of $m_o x_{o1}$. When gear cutting is done by a rack cutter or a hob, the cutter having such thickness in the pitch line direction as being thicker than the normal thickness by such amount as $m_o u_1$, may be used to finish gear cutting by one cutting with the amount of vertical addendum modification of $m_o x_1$.

What is claimed is:

1. Profile shitfted involute internal gear apparatus consisting of internal gear and pinion having no difference in the number of teeth between internal gear and pinion and having contact ratio of greater than 1, which is characterized by at least satisfying every one of the following formulas:

condition for addendum circle of internal gear being larger than base circle:

$$\left.\begin{array}{c} Z_o \geq \dfrac{2(h_{ok}-x_{o2})}{1-\cos \alpha_c} \\ \text{or} \\ \alpha_{ok2} \geq 0 \end{array}\right\} \quad (1)$$

condition for the addendum or tip of internal gear tooth not being sharply pointed:

$$\left.\begin{array}{c} \dfrac{\pi}{2} - 2x_{o2} \tan \alpha_c - u_2 - Z_o(\text{inv } \alpha_c - \text{inv } \alpha_{ok2}) \geq 0 \\ \text{provided that} \\ \text{inv } \alpha_{ok2} = \tan \alpha_{ok2} - \alpha_{ok2} \\ \cos \alpha_{ok2} = \dfrac{Z_o \cos \alpha_c}{Z_o - 2h_{ok} + 2x_{o2}} \end{array}\right\} \quad (2)$$

condition for addendum or tip or the pinion tooth not being sharply pointed $$\left.\begin{array}{c} \dfrac{\pi}{2} + 2x_{o1} \tan \alpha_c - u_1 - Z_o(\text{inv } \alpha_{ok1} - \text{inv } \alpha_c) \geq 0 \\ \text{provided that} \\ \text{inv } \alpha_{ok1} = \tan \alpha_{ok1} - \alpha_{ok1} \\ \cos \alpha_{ok1} = \dfrac{Z_o \cos \alpha_c}{Z_o + 2h_{ok} + 2x_{o1}} \end{array}\right\} \quad (3)$$

condition for pinion for not having undercut:

$$x_{o1} \geq h_{ok} - \tfrac{1}{2} Z_o \sin^2 \alpha_c \quad (4)$$

condition for contact ratio $\epsilon_o$ for being larger than 1:

$$\frac{1}{\pi} \left\{ \frac{Z_o}{2}(\tan \alpha_{ok1} - \tan \alpha_{ok2}) + \tan \alpha_c(x_{o2}-x_{o1}) + \tfrac{1}{2}(u_1+u_2) \right.$$

$$\left. - \frac{\dfrac{S_n}{m_o}}{2 \cos \alpha_c} \right\} \geq 1 \quad (5)$$

condition for avoiding involute interference:

$$(x_{o2}-x_{o1}) \leq \frac{Z_o}{2} \cot \alpha_c \tan \alpha_{ok2} - \tfrac{1}{2} \cot \alpha_c (u_1+u_2)$$

$$+ \frac{\dfrac{S_n}{m_o}}{2 \sin \alpha_c} \quad (6)$$

condition for center distance becoming $a_o$:

$$a_o = m_o \{\sin \alpha_c(x_{o2}-x_{o1}) + \tfrac{1}{2} \cos \alpha_c(u_1+u_2)\} - \frac{S_n}{2} \quad (7)$$

References Cited

UNITED STATES PATENTS 3,037,400   6/1962   Sundt _____ 74—462X
3,496,802   2/1970   Cork et al. _____ 74—462X LEONARD HALL GERIN, Primary Examiner U.S. Cl. X.R.

74—462

UNITED STATES PATENT OFFICE
CERTIFICATE OF CORRECTION

Patent No. 3,572,151                     Dated March 23, 1971

Inventor(s)  MUNEHARU MOROZUMI ET AL

It is certified that error appears in the above-identified patent and that said Letters Patent are hereby corrected as shown below:

In the specification, column 3, line 19 should read as follows:

-- $x_{01}$ = -2.0 to 0.5 (calculated at every 0.1 value)

and column 4, line 34, the word before "latitude" should read -- upper --

Signed and sealed this 7th day of September 1971.

(SEAL)
Attest:

EDWARD M. FLETCHER, JR.
Attesting Officer

ROBERT GOTTSCHALK
Acting Commissioner of Pat